United States Patent [19]

Bossert et al.

[11] 4,166,053

[45] Aug. 28, 1979

[54] PROCESS FOR THE MANUFACTURE OF NON-REVERTING ELASTOMERIC ORGANOPOLYSILOXANES

[75] Inventors: Emily C. Bossert, Westfield; Irwin B. Silverstein, Piscataway; Abe Berger, Summit, all of N.J.

[73] Assignee: M & T Chemicals Inc., Stamford, Conn.

[21] Appl. No.: 893,270

[22] Filed: Apr. 5, 1978

[51] Int. Cl.$^2$ ............................................. C08L 91/00
[52] U.S. Cl. ............................... 260/18 S; 260/37 SB; 528/18; 528/34; 528/42; 528/43; 528/901
[58] Field of Search ............ 260/18 S, 46.5 G, 37 SB; 528/11, 18, 34, 901, 42, 43

[56] References Cited

U.S. PATENT DOCUMENTS

| | | | |
|---|---|---|---|
| 3,127,363 | 3/1964 | Nitzsche et al. ........................ 260/18 |
| 3,349,048 | 10/1967 | Vaughn, Jr. ........................... 260/18 S |
| 3,941,856 | 3/1976 | Creasey et al. .................. 260/46.5 G |
| 3,956,209 | 5/1976 | Hamilton, Jr. et al. ......... 260/46.5 G |

*Primary Examiner*—Melvyn I. Marquis
*Attorney, Agent, or Firm*—Kenneth G. Wheeless; Robert Spector

[57] ABSTRACT

Heat-resistant, polyorganosiloxane elastomers are prepared by reacting a linear, difunctional polyorganosiloxane with a silicon-containing crosslinking agent and a stannous salt of a monoethylenically unsaturated monohydroxy monocarboxylic acid as the curing catalyst. A filler can optionally be included in the formulation. The present catalysts are unique in that they impart a relatively long working life to the uncured composition yet do not catalyze the depolymerization reaction at elevated temperatures as do conventional organotin catalysts such as dibutyltin dilaurate.

8 Claims, No Drawings

PROCESS FOR THE MANUFACTURE OF NON-REVERTING ELASTOMERIC ORGANOPOLYSILOXANES

BACKGROUND OF THE INVENTION

This invention relates to the preparation of elastomeric organopolysiloxanes. This invention further relates to the preparation of elastomeric, heat-resistant organopolysiloxanes which do not revert to lower molecular weight liquids or semi-solids when exposed to elevated temperatures.

It is well known to prepare elastomeric, polymeric organopolysiloxanes by reacting a precondensed organosiloxane of the general formula $$XO-Si(R)_2-[O-SiR_2]_n-O-Si(R)_2-OX$$

wherein R is alkyl or aryl, X is hydrogen or alkyl and n represents an integer of 50 or more, with a polyfunctional silicon-containing crosslinking agent such as a tri- or tetraalkoxy silane in the presence of a suitable catalyst. U.S. Pat. No. 3,127,363 discloses that this reaction can be carried out under relatively mild conditions if a filler such as carbon black, one of the various types of clays or diatomaceous earth is present during the reaction of the precondensed organosiloxane with the curing agent. The resultant cured materials are disclosed as being useful for a variety of applications, including sealants, casting compositions, coatings, encapsulants and molding compositions. The aforementioned U.S. Pat. No. 3,127,363 teaches that any of the known catalysts for curing silicone resins can be employed. These catalysts include metal soaps, metal oxides, metal chelates such as chromium acetylacetonate, metal salts of thiols or dithiocarbamic acids, organometallic compounds such as dibutyltin dilaurate and phenyl mercury acetate and basic nitrogen-containing compounds, preferably amines and substituted amines such as triethanol amine. The majority of the examples in this patent employ dibutyltin dilaurate as the catalyst. While this compound and other organotin compounds yield acceptable cured polyorganosiloxane elastomers which retain their initial properties virtually indefinitely at ambient temperatures, polyorganosiloxanes prepared using organotin compounds wherein tin is in a tetravalent state are not stable when exposed to temperatures above about 150° C. At these temperatures the organotin compound catalyzes an irreversible depolymerization to low molecular weight liquid or semi-solid products. Organotin compounds therefore cannot be employed if the cured elastomers are to be exposed to the operating temperatures of high power electronic equipment, which often exceed 150° C.

It is possible to avoid the problem of depolymerization or "reversion" at elevated temperatures by employing a stannous compound such as stannous-2-ethylhexoate in place of an organotin compound. While stannous compounds as a class may be useful for certain applications the catalytic activity of these compounds is so high that even at minimum effective concentrations the working or "pot" life of a catalyzed composition is extremely short and may be as short as five minutes. For certain applications, particularly when thicker sections are desired, stannous compounds as a class cannot be employed. The uppermost layer may cure rapidly to form an impenetrable skin while the lower layers remain uncured or only partially cured.

Surprisingly it has now been found that stannous salts of certain ethylenically unsaturated hydroxycarboxylic acids containing from 10 to about 20 carbon atoms are unique among stannous compounds in that the working life of a typical uncured polysiloxane composition is one hour or more. In addition, the properties of the cured product, including hardness, are equivalent or superior to those obtained using conventional catalysts such as amines and tin compounds.

SUMMARY OF THE INVENTION

The present invention provides an improved method for preparing heat-resistant elastomeric polyorganosiloxanes by reacting (1) as the major component, a linear difunctional polysiloxane of the general formula $$XO-Si(R^1)_2-[OSi(R^1)_2]_n-O-Si(R^1)_2-OX$$

wherein $R^1$ is selected from the group consisting of lower alkyl, aryl and halomethyl, X is hydrogen or $R^1$ and n is an integer greater than 50, (2) as the crosslinking agent a compound of the general formula $R_m^2SiY_{4-m}$ wherein $R^2$ is alkyl or aryl, Y is alkoxy and m is 0 or 1 and (3) an effective amount of a catalyst, wherein the improvement resides in employing as said catalyst a stannous salt of a monoethylenically unsaturated monohydroxy monocarboxylic acid containing from 10 to 20 carbon atoms.

This invention also provides compositions for preparing heat-resistant elastomeric polysiloxanes. The compositions contain the three ingredients listed in the preceding paragraph.

DETAILED DESCRIPTION OF THE INVENTION

The novel feature of the present invention resides in the catalyst employed for the reaction of the difunctional polysiloxane with the crosslinking agent to form the cured elastomeric polyorganosiloxane. These catalysts are stannous salts of ethylenically unsaturated hydroxycarboxylic acids that contain from 10 to 20 carbon atoms. A preferred catalyst is the stannous salt of ricinoleic acid (12-hydroxy-9-octadecenoic acid). As previously disclosed, this class of catalysts is unique among the compounds of divalent tin, most of which are too active for use with conventional polyorganosiloxane compositions. The working life or pot life of polyorganosiloxane compositions containing stannous-2-ethylhexoate is five minutes or less. Replacing the 2-ethylhexoic acid with oleic acid increases the working life to about 30 minutes. By the addition of a hydroxyl group to oleic acid to form ricinoleic acid, the catalytic activity of the corresponding stannous salt is reduced by a factor of four, and the working life of a polysiloxane composition containing this catalyst is increased to two hours or more. It is not apparent that the addition of a hydroxyl group to an ethylenically unsaturated carboxylic acid would have such a profound effect on the catalytic activity of the corresponding stannous salt, with a resultant increase in the working life of the composition.

The present catalysts can be employed to prepare cured polyorganosiloxane elastomers at ambient temperatures using any of the conventional precondensed difunctional organosiloxanes, crosslinking agents and optional inert fillers. Suitable reagents and fillers are disclosed in U.S. Pat. No. 3,127,363, the pertinent sections of which are hereby incorporated by reference.

The present crosslinking agents are preferably organosilicates represented by the formula $R_nSi(OR')_{4-n}$ wherein R' usually contains from 1 to 4 carbon atoms. These crosslinking agents can be employed as the monomeric compound or as a liquid product obtained by partial hydrolysis of the monomeric compounds using water and small amounts of acid.

The amounts of alkyl silicate and curing catalyst can be varied within fairly wide limits, depending upon the desired curing time and the desired physical properties of the cured material. Generally it has been found that the alkyl silicate or an oligomeric hydrolysis product derived therefrom can be present at concentrations of from 0.1 to 10%, and the catalyst is present at concentrations of from 0.1 to about 5%, both concentration ranges being based on the weight of polyorganosiloxane. The weight ratio of organosilicate to catalyst is generally from 0.1 to 3 parts of catalyst per part of silicate.

In addition to the silicone compounds and catalyst the curable compositions of this invention generally contain one or more reinforcing fillers to modify the physical properties of the final cured product. Useful fillers include calcium carbonate, titanium dioxide, lithopone, zinc oxide, fumed silica, and glass fibers. The amount of filler used can be varied within relatively wide limits (10 to about 300%, based on the aforementioned polyorganosiloxane), depending upon the density of the filler and the application of the final cured product.

The present compositions can be prepared by blending the silicon compounds, catalyst and any other ingredients, including fillers, until a homogeneous mixture is obtained. The viscosity of such a mixture will remain relatively stable for two hours or longer at ambient temperature (20° to 30° C.) and a relative humidity below about 70%, which is the desired working life for an uncured composition. It may be desirable to store a catalyzed composition for short periods of time prior to curing.

The following example represents a preferred embodiment of this invention and should not be interpreted as limiting the scope of the claims.

The composition employed to evaluate the various catalysts contained 100 parts by weight of a hydroxyl-terminated dimethylpolysiloxane exhibiting a degree of polymerization, represented by n in the foregoing formula, of from 25 to 50, 3 parts by weight of a partially hydrolyzed ethyl silicate and 40 parts calcium carbonate. Fifty grams of this composition were combined with a specified amount of the catalyst to be evaluated and stirred rapidly to insure homogenity. The resultant mixture was allowed to remain under ambient conditions. Periodically, at about quarter hour intervals, the mixtures were tested using a spatula. Initially the compositions were sufficiently fluid to flow or drip off the spatula. As curing progressed the fluid became more elastomeric in character. As the spatula was withdrawn from the material a portion of the material adhered to the spatula but remained connected to the main mass of material. At a point during the curing cycle the connecting portion elongated to an extent and then abruptly severed or "snapped" in a manner similar to a rubber band when elongated beyond its elastic limit. The time at which this elastomeric behavior, referred to as "snap" was first observed is recorded in the accompanying table as the "snap time".

The hardness of the final cured product was measured using a Shore type A durometer. The cured material was then heated at 200° C. for 24 hours in an oven, following which the hardness was again measured. A decrease in hardness indicates that partial depolymerization of the cured product had occurred during heating. Each of the catalysts was employed at a concentration level equivalent to a tin content of 0.1%, based on the weight of the composition.

Stannous ricinoleate was prepared by reacting ricinoleic acid (90% purity) with stannous methoxide in a molar ratio of 1.8:1, respectively. Toluene was employed as the diluent and the reaction mixture was heated to the boiling point. The methanol which formed as a by-product was removed by azeotropic distillation at a temperature of 64° C. After substantially all of the methanol had been removed the reaction mixture was heated at the boiling point for ½ hour, following which the toluene was evaporated. The product, stannous ricinoleate, was an amber liquid that was found to contain 15.5% tin.

The other catalysts evaluated are commercially available.

| Catalyst Type | Catalyst Concentration (% by weight) | Snap Time (Hours) | Hardness (Shore A) Ambient[1] | Hardness (Shore A) 100° C. |
|---|---|---|---|---|
| Stannous Ricinoleate | 0.71 | 2.3 | 45 | 49 |
| Dibutyltin Dilaurate (control) | 0.55 | 3.0 | 50 | 35 |
| Stannous-2-Ethylhexoate (control) | 0.36 | 0.2 | 50 | 49 |
| Stannous "Oleate"[2] (control) | 0.60 | 0.5 | 50 | 51 |
| Dibutyltin-S,S'-bis (isooctyl mercaptoacetate) (control) | 0.55 | 4[3] | 37 | 20 |

[1]Exposure Time = 24 hours.
[2]Prepared using a commercial grade of oleic acid (a mixture consisting mainly of oleic and linoleic acids).
[3]Formulation cured at 100° C.

The data in the preceding table demonstrate that while the extent of cure (determined by hardness of the sample) achieved using stannous 2-ethylhexoate and stannous oleate was acceptable and no depolymerization occurred at 200° C., the working time or "pot life" of catalyzed compositions was relatively short. The working life can be extended using organotin compounds wherein tin is in the tetravalent state, however, these compounds also catalyze polymer degradation at elevated temperatures, as indicated by the decrease in hardness when the samples were heated at 200° C. for 24 hours. The present class of stannous compounds are unique in that they combine the advantages of stannous and organotin compounds yet do not exhibit the disadvantages of either class of catalysts.

What is claimed is:

1. In an improved method for preparing heat-resistant elastomeric polyorganosiloxanes by reacting (1) as the major component, a linear, difunctional polyorganosiloxane of the general formula XO—Si(R$^1$)$_2$[OSi(R$^1$)$_2$]$_n$O—Si(R$^1$)$_2$—OX wherein R$^1$ is selected from the group consisting of lower alkyl, aryl and halomethyl, X is hydrogen or R$^1$ and n is an integer greater than 50, (2) as the crosslinking agent a compound of the general formula $R_m^2SiY_{4-m}$ wherein $R^2$ is alkyl or aryl, Y is alkoxy and m is 0 or 1 and (3) a catalyst in an amount sufficient to effect curing of said polysiloxanes, wherein the improvement resides in employing as said catalyst a stannous salt of a monoethylenically unsaturated monohydroxy monocarboxylic acid containing from 10 to 20 carbon atoms.

2. The improved method of claim 1 wherein said acid contains 18 carbon atoms.

3. The improved method of claim 2 wherein said acid is ricinoleic acid.

4. The improved method of claim 1 wherein said crosslinking agent is present at a concentration of from 0.1 to 10%, based on the weight of polyorganosiloxane.

5. The improved method of claim 1 wherein said catalyst is present in an amount of from 0.1 to 5%, based on the weight of polyorganosiloxane.

6. The improved method of claim 1 wherein Y is alkoxy and contains from 1 to 4 carbon atoms.

7. The improved method of claim 1 wherein Y is ethoxy.

8. The improved method of claim 1 wherein an inert filler is present during the reaction of the polyorganosiloxane with the crosslinking agent.

* * * * *